United States Patent [19]

Brown et al.

[11] Patent Number: 4,615,898

[45] Date of Patent: Oct. 7, 1986

[54] COLD WATER SOLUBLE GELATIN

[75] Inventors: James Brown, Huntington, Conn.; Peter E. Ellis, Riverdale, N.Y.; Marta J. Draper, Westport, Conn.

[73] Assignee: Nabisco Brands, Inc., Parsippany, N.J.

[21] Appl. No.: 704,713

[22] Filed: Feb. 25, 1985

[51] Int. Cl.⁴ ............................................... A23L 1/04
[52] U.S. Cl. ..................................... 426/576; 426/456
[58] Field of Search ............... 426/576, 443, 455, 456, 426/465

[56] References Cited

U.S. PATENT DOCUMENTS

| | | | |
|---|---|---|---|
| 2,803,548 | 8/1957 | Hagerty | 99/130 |
| 2,819,970 | 1/1958 | Steigmann | 99/130 |
| 2,819,971 | 1/1958 | Gunthardt | 99/130 |
| 2,841,498 | 7/1958 | Cahn et al. | 99/130 |
| 2,948,622 | 8/1960 | Cahn | 99/130 |
| 3,904,771 | 9/1975 | Donnelly | 426/576 |
| 3,927,221 | 12/1975 | Kalafatas et al. | 426/576 |
| 4,401,685 | 8/1983 | Brown et al. | 426/576 |
| 4,407,836 | 10/1983 | Bosco et al. | 426/576 |
| 4,409,255 | 10/1983 | Danielson et al. | 426/576 |

FOREIGN PATENT DOCUMENTS 896965  4/1972  Canada ................................. 99/130

*Primary Examiner*—Jeanette Hunter
*Attorney, Agent, or Firm*—Richard Kornutik

[57] ABSTRACT

An improved cold water soluble gelatin and a process of preparing it. The improved cold water soluble gelatin is prepared by a process which includes the steps of preparing an aqueous solution containing water, gelatin and sugar selected from corn syrup solids, maltodextrin, and mixtures thereof, maintaining the solution so prepared at at least one temperature in the range of 110° F. to 180° F. for a holding period of about 1 hour to about 24 hours, and thereafter drying the resulting solution. An acid is incorporated in the solution either before or after the holding period and prior to the drying step.

The cold water soluble gelatins so prepared are characterized by improved solubility and ease of dispersion in water as well as by the clarity of the gels produced therefrom.

20 Claims, No Drawings

COLD WATER SOLUBLE GELATIN

BACKGROUND OF THE INVENTION

The present invention relates to cold water soluble gelatin; and, particularly, to an improved cold water soluble gelatin product and a process for preparing it.

Gelatin is a widely used food ingredient. It has the ability to thicken or otherwise improve the texture of a variety of liquid products and also to set to a heat reversible gel which is useful in preparing products such as gelatin desserts. In products such as salad dressings, it aids in suspending particulate ingredients, and in frozen products such as ice cream it has the ability to retard the growth of ice crystals.

The art has long recognized a need for cold water soluble gelatin products. Unfortunately, it has been difficult until this time to achieve good solubility for gelatin in cold water. One area in particular where cold water solubility would be desirable is for the preparation of gelatin dessert mixes. There is a growing demand for all categories of food products which can be fully prepared and ready for consumption in the shortest period of time. The vast majority of gelatin dessert mixes which are currently available require the use of hot or boiling water to dissolve the gelatin and extended times, on the order of from about 2 to 4 hours, to permit them to achieve the proper consistency for eating. Thus, these products are often viewed as inconvenient because they require the use of hot or boiling water and also because of the extended setting time before they can be enjoyed. Because of this, many consumers who enoy eating gelatin desserts and salads prepared with them forego their use because they perceive them as too inconvenient.

This problem was recognized by Hagerty in U.S. Pat. No. 2,803,548 wherein he disclosed that a room-temperature soluble gelatin could be prepared by drying a gelatin solution at reduced pressure within a relatively narrow temperature range of between 37° and 70° C. According to his procedure, an aqueous gelatin solution, preferably containing a sugar such as sucrose, was first prepared by heating and was then dried at the indicated temperatures at pressures of from 50 to 100 millimeters of mercury. The disclosure emphasizes the need to dry at the indicated temperatures at pressures of from 50 to 100 millimeters of mercury. The disclosure emphasizes the need to dry at the indicated temperatures and states where dextrose or corn syrup are substituted for the sucrose, a dense, rather than fluffy, product is produced. While the patent suggests that the material is soluble in cold water, no specific details as to water temperature or time for solution are given. The patent does indicate, however, that gel strength of products prepared according to the disclosure are about 10% less than those prepared by conventional techniques.

In U.S. Pat. No. 2,948,622, Cahn discloses that a hot solution comprising about one part gelatin, nine parts sugar and 10 parts water can be dried as a thin film, and that the dry product is soluble in cold tap water. Contrary to the disclosure of Hagerty, Cahn indicates that the temperature should be between 70° and 120° C. and the pressure should be near atmospheric. He indicates, however, that pressures down to about 0.75 atmospheres can also be employed. While the exact conditions of dissolution of the final product in cold water are not given, it is indicated that the product of at least one example can be dissolved in cold water and then fully set by cooling for about 45 minutes at a temperature of 10° C.

In addition to the batch drying process of Hagerty and the atmospheric drum drying process of Cahn, these two workers together disclosed in U.S. Pat. No. 2,841,498 that a cold water soluble gelatin could be prepared by spray drying an aqueous solution of sucrose and gelatin, provided that the sucrose content was at least 8 times, and preferably on the order of 9 or 10 times, the gelatin content. This disclosure is very specific as to the need for sugar to be sucrose and that the sucrose be present in a specific concentration. While other sugars such as dextrose and corn syrup solids are disclosed, they are mentioned only for admixture with the spray dried product. Cahn and Hagerty disclose that after dissolving their product in cold water, it sets to a gel within between about 7 to 15 minutes when cooled to about 32° F., and a solution at 75° F. when placed in an ordinary kitchen refrigerator sets to a firm gel therein in about one and one-half hours. It is disclosed that the acid component can be included prior to drying if desired.

In Canadian Pat. No. 896,965 to de Boer and U.S. Pat. No. 3,904,771 to Donnelly et al, there are described procedures for preparing various cold water soluble gelatin products by spray drying solutions comprising gelatin and an acid. Donnelly et al disclose that in addition to the acid which is employed at a level of from about 30 to 200% by weight of gelatin, the solution can contain a sugar such as fructose or sucrose prior to spray drying. In the Canadian patent, however, de Boer indicates that sugar can be eliminated from the spray drying solution where the acid is employed at a level of from about 5 to about 20% based upon the weight of the gelatin. According to de Boer, spray drying the dilutely acid gelatin solution permits the formation of fine droplets for enhanced drying.

According to the disclosure of Kalafatas in U.S. Pat. No. 3,927,221, the need for elaborate or extensive drying systems of the type described in U.S. Pat. Nos. 2,803,548, 2,841,498 and 2,948,622 can be obviated by the use of an extrusion process. According to this disclosure, the cold water soluble gelatin composition is prepared by subjecting a sugar/gelatin admixture to heat and pressure while applying shearing forces to the admixture in an extruder. The products are said to dissolve in water at about 50° F. after 2 minutes of spoon stirring. The solutions prepared in this manner are set after about two hours refrigeration, as compared to about four hours when hot water is used to dissolve conventional gelatin dessert mixes. The disclosure incidentally mentions the use of dispersants, wetting agents and emulsifiers to enhance dispersibility. Similarly, U.S. Pat. No. 2,819,970 to Steigmann and U.S. Pat. No. 2,819,971 to Gunthardt also mention the use of additives of this type.

Recently issued U.S. Pat. Nos. 4,401,685; 4,407,836; and 4,409,255 describe processes for the preparation of cold water soluble gelatins which possess markedly improved properties as compared with those previously known in the art. These patents all call for the use of a particular sugar composition, namely a mixture of corn syrup solids and maltodextrin, in combination with gelatin in a range of ratio of sugar to gelatin by weight of 2:1 to 12:1 preferably 3–7:1. An aqueous solution is prepared containing the gelatin, sugar, an acid and a surfactant and the solution is dried. In the '685 patent, the drying is effected by spreading a thin layer of the solution on a surface heated with steam at 10-60 psig pressure. In the '836 patent, the solution is extruded as a foam and then dried.

It has now been found that cold water soluble gelatins having even more enhanced properties can be obtained by a modification of the processes described in the latter three patents set forth above, which modification is described in detail below.

SUMMARY OF THE INVENTION

It is an object of the present invention to provide a gelatin product which is completely dispersed and dissolved in cold water.

It is another object of the present invention to provide a cold water soluble gelatin product which, after dissolution in cold water, forms a gel of good strength and high quality in a conveniently short period of time.

It is another and more specific object of the present invention to provide a gelatin dessert mix which can be fully dissolved in tap water with vigorous spoon stirring and then set to a high quality dessert in a conveniently short period of refrigeration.

It is another object of the present invention to provide an improved process for preparing a cold water soluble gelatin product.

It is yet another and more specific object of the present invention to provide a process for preparing a cold water soluble gelatin product which is completely dissolved in cold tap water and is then fully set to form a high quality gel within a conveniently short period of refrigeration.

These and other objects are achieved according to at least the preferred embodiments of the present invention which provides a process for preparing a cold water soluble gelatin product, the product of that process, and a gelatin dessert mix which is fully soluble in cold water. The process according to the invention comprises an improvement or modification of the processes described in the aforesaid U.S. Pat. Nos. 4,401,685; 4,407,836 and 4,409,255. The principal improvement or modification comprises subjecting the aqueous solution comprising sugar, gelatin, and other optional components, prepared as described in said patents, to a heat treatment prior to carrying out the drying step described in said patents. The heat treatment step comprises maintaining said solution at at least one temperature in the range of about 110° F. to about 180° F. for a holding period of about 1 hour to about 24 hours, an acid being incorporated into said solution either before or after said holding period and prior to the drying step.

The product of this modified process is useful in all applications where cold water solubility would be advantageous, and it is particularly useful in the preparation of gelatin dessert mixes which are fully soluble in cold water. The dessert mixes according to the present invention include acid, buffer, flavor and color, in addition to the cold water soluble gelatin prepared according to the process of the invention.

DETAILED DESCRIPTION OF THE INVENTION

The improved cold water soluble gelatin product prepared according to the present invention finds particular utility in gelatin dessert mixes, and will therefore be described in this environment as exemplary. This is not meant to imply, however, that other applications of the product are not intended. In fact, the products of the invention will be very useful in the preparation of salad dressings, ice cream, cake and pie mixes which require no baking, candies, and a wide variety of food products which currently employ gelatin or gelatin-like materials.

As a matter of definition, the term "cold water soluble" as used in the present application means that the product can be dissolved in tap water at the indicated concentration of usage in less than about 5 minutes, and preferably less than 1 minute, by stirring with a spoon to provide vigorous agitation. The temperature of tap water as delivered at the faucet can vary over a wide range generally from about 50° F. to about 70° F. although temperatures above and below this range can be encountered. The temperature of the tap water in any given instance can influence the rate at which a product of the invention will dissolve. Similarly, variation in mineral content of the tap water may also affect the rate at which the product dissolves.

The term "amorphous gelatin" as used herein means gelatin products which pass directly from the liquid solution to the dry state without forming a gelled state. Typically, amorphous gelatin products form clumps when mixed with cold water; however, these problems are alleviated according to the invention. Also by way of definition, all parts and percentages used throughout this disclosure are on a weight to weight basis, unless the contrary is indicated at the point of usage.

While the most important ingredient according to the present invention is gelatin, the particular type of gelatin employed is selected primarily based upon the intended use of the ultimate product, and not for any particular functionality of the gelatin within the process of the invention. Therefore, the cold water soluble gelatin products of this invention can be prepared from gelatins of either the Type A (acid) or Type B (alkali) forms. Similarly, the gelatin can be prepared from any collagen source including bone, hide and other collagen sources and can be derived from any suitable animal, including beef and pork sources. The bloom will typically be within the range of from about 150 to 275.

As set forth above the process of the invention comprises a modification or improvement of that set forth in the prior U.S. Pat. Nos. 4,401,685; 4,409,255 and 4,407,836 (hereinafter "the said prior patents"). The latter describe the preparation of an aqueous solution comprising gelatin, sugar and an acid followed by drying of the same using various drying procedures. The present invention utilizes these same two steps but interposes a third step therebetween as will be described in detail below.

The preparation of the aqueous solution and the drying of the same can be carried out using the procedures and ingredients described in the said prior patents whose disclosure is hereby incorporated herein by reference.

Illustratively, the aqueous solution comprising gelatin and sugar is prepared by heating the gelatin and sugar in the desired concentration in water, preferably to a temperature of about 150° F. to 180° F., to achieve complete solution. Typically, this is conducted by dissolving the gelatin in hot water first and then adding sugar to the gelatin solution. Advantageously, a gelatin solution from a gelatin production process, typically containing about 15 to 20% gelatin can be mixed with dry sugars or concentrated sugar solutions to achieve the desired concentration. The gelatin concentration is typically within the range of from about 5 to about 25% and the sugars concentration is typically within the range of from about 20 to about 80%, based on the weight of the total solution. The ratio of sugars to gelatin is critical from a processing standpoint. Advantageously, the ratio is within the range of from greater than 2:1 up to about 12:1, and preferably is within the range of from about 3:1 to about 7:1. The total solids concentration of the solution for drying, including the sugar, gelatin and any other solid materials, is advantageously within the range of from about 30 to about 70%. A particularly useful concentration of total solids is of the order of 60%.

The terms "sugar" and "sugars" as they are employed in the present context are to be understood as meaning any of a number of useful saccharide materials which are capable of being dried under the conditions of processing of the invention to maintain the gelatin in an amorphous state. Saccharide materials which meet this definition will provide a degree of cold water solubility, and preferences for a specific material based upon its affinity for water or its contribution to the sweetness or the texture of the final product will control the final selection. Included in the list of useful sugars are monosaccharides, disaccharides, and polysaccharides and their degradation products; e.g., pentoses, including aldol pentoses, methyl pentoses, keto pentoses, like xylose and arabinose; dioxy aldoses like rhamnose, hexoses and reducing saccharides such as aldo hexoses like glucose, galactose and mannose; and keto hexoses, like fructose and sorbose; disaccharides, like lactose and maltose; non-reducing disaccharides such as sucrose; and other polysaccharides such as raffinose and various hydrolyzed starch products which contain as their constituents oligosaccharides and smaller molecules. Typical of the hydrolyzed starch materials are those from corn starch, e.g., corn dextrin (1–13 DE), maltodextrin (13–23 DE), and corn syrup (28+ DE). Of these, corn syrups with DE values of 42 and below and maltodextrins are found to significantly improve drying and product solubility when used as major sugar constituents.

In addition to the gelatin and the sugar, the aqueous solution for drying can also comprise an acid suitable for food use such as fumaric, citric, malic, adipic, ascorbic, tartaric, succinic, and phosphoric acids. Among these, fumaric, citric and adipic acids are preferred. The acid, when employed, is found to improve final product solubility and advantageously is present in a ratios of acid to gelatin within the range from about 0.05–0.5:1. More preferred ratio of acid to gelatin are within the range of from about 0.10–0.23:1 which range significantly improves product solubility and can provide all the acid that is required for a good tasting gelatin dessert. It may sometimes also be desirable to employ a suitable buffer such as a sodium or potassium salt of any of the above mentioned acids. The pH of the dessert may be adjusted to within the range of from about 3 to about 4.5 by use of the buffering salts.

In carrying out the process of the invention the acid can be incorporated directly into the aqueous solution at the same time as the gelatin and sugar are introduced therein in the manner described above. However, as explained more fully below, the acid can be introduced at later stages of the process of the invention provided that the acid is always introduced at a stage preceding the drying step.

According to a preferred embodiment of the invention, the aqueous solution which is prepared as described above also contains a surface-active agent, such as those known generically to the art as polysorbates, hydroxylated lecithin, acetylated mono-glycerides, succinylated monoglycerides, ethoxylated mono- and diglycerides, sodium stearoyl 2-lactylate and the like. These surface-active agents will be employed in amounts effective to render the dried product more easily dispersible in cold water. Exemplary of the polysorbate surface-active agents are polysorbate 60, polysorbate 65 and polysorbate 80. Polysorbate 60 is identified chemically as polyoxyethylene (20) sorbitan monostearate while polysorbate 65 is known as polyoxyethylene (20) sorbitan tristearate, and polysorbate 80 is known as polyoxyethylene (20) sorbitan monooleate. In addition to these materials, other surface-active agents which have the ability of increasing the dispersibility of the final product in cold water can also be employed. While the exact level of addition will be controlled based upon a balance between cost, effectiveness and taste, it is preferred to maintain the level within the range of from about 0.05 to about 7% based upon the weight of the gelatin to provide the desired degree of improvement in dispersibility without adversely affecting the ultimate rate of set or gel strength of the cold water soluble gelatin product produced according to the process of the invention.

The aqueous solution so prepared is then subjected to the heat treatment step of the invention. In this step, the aqueous solution, which usually has been heated as described above in order to prepare the solution, is maintained at at least one temperature in the range of about 110° F. to about 180° F. for a holding period of time not less than about 1 hour and, preferably, not more than about 48 hours and advantageously not more than 24 hours. The precise temperature and time to be employed in any given instance will vary depending upon the particular combination of gelatin and sugar employed. The most advantageous temperature and time to be employed in any given instance can be readily determined by a process of trial and error.

A number of alternative ways of carrying out this heat treatment step can be employed. Thus, in one alternative, the holding period is carried out by maintaining the solution at a temperature in the higher end of said temperature range, and preferably at a temperature of about 160° F. for a holding period within the above stated range, preferably a holding period of up to about 4 hours. When the holding period is complete the solution is then cooled, or allowed to cool to a temperature of about 115° F. prior to being submitted to the drying step. In another alternative form of heat treatment the solution, after having been formed initially at a temperature of about 150° F. to about 160° F., is then cooled or allowed to cool to a temperature in the range of about 115° F. to 130° F. and maintained thereat for a holding period within the above stated range of about 1 to about 48 hours. In this particular alternative form of heating step the holding period is longer than is normally required in the previous alternative method and is generally in the order of up to about 24 hours. In a further alternative the aqueous solution can be submitted to two separate holding periods one of which is at a temperature in the higher end of the above range and the other of which is at a temperature in the lower end of said range.

Irrespective of which of the above alternatives is employed the acid which, as discussed above, is required to be present during the subsequent drying step can be incorporated in the aqueous solution either initially (i.e. during the initial formation of the solution), or prior to the holding period, or after the holding period and just prior to the subsequent drying step.

The above heating step can be accomplished using any conventional processing equipment. The inclusion of this heat treatment step in preparing cold water soluble gelatins in accordance with the invention gives rise to a product which, on admixture with cold water, rapidly disperses therein and forms a gel having improved clarity.

After the heat treatment step has been completed, the treated solution is then dried using any of the methods described in the said prior patents. Illustratively, the solution is applied in a thin layer to the surface of a suitable dryer, such as the Buflovak double drum vacuum drum dryer or vacuum drum dryer of similar type. Typically, the thickness of the layer will be within the range of from about 0.1 to about 3.0 millimeters. The surface of the dryer is preferably heated from the reverse side by steam to a temperature effective for drying the solution within a commercially practical period of time while maintaining the gelatin in the amorphous state. Typically, the residence time of the solution on the drying surface from the time of application to the time of complete drying will be less than about 5 minutes, preferably less than about 1 minute. Steam at a pressure of from about 5 to about 60 psig will be effective for supplying adequate heat. More typically, the steam pressure will be within the range of from about 5 to about 20 psig.

The solution is dried on the surface under a reduced pressure. Absolute pressures of less than about 5 inches of mercury are effective. The reduced pressure causes rapid volatilization of the water within the solution and creates a light, friable, flaky product which exhibits good cold water solubility immediately after removal from the surface by means of a knife-edged scraper blade or other suitable means. It is preferred, however, to further reduce and classify the particle size of the dried cold water soluble gelatin product to a more uniform size such as by grinding and screening. The dried material is preferably ground or otherwise comminuted and classified to a particle size of from about 20 to about 200 US series mesh. Preferably the particle size is such that at least about 90 percent of the particles will pass through 30 US mesh and most will be retained on 200 US mesh. This decrease in the particle size compared with products previously described yields a cold water soluble gelatin having improved dispersibility and solubility.

Preferred bulk densities for the dry cold water soluble gelatin product of the invention will be within the range of from about 0.2 to about 0.3 grams per cubic centimeter.

The cold water soluble gelatins prepared in accordance with the present invention possess significantly improved solubility and more rapid dispersibility in water and give rise to gels with improved clarity as compared with products prepared in accordance with prior procedures including those described in the said prior patents. These improvements are illustrated by the data set forth in the specific Examples below.

The dried cold water soluble gelatin product prepared according to the process of the invention can be compounded with other typical ingredients of dry gelatin dessert mixes to prepare a gelatin dessert mix which is, itself, cold water soluble. Typically, the dry gelatin dessert mix prepared according to the invention will comprise the cold water soluble gelatin plus additional amounts of sweeteners, acidulents, buffers, flavors, antifoaming agents, and colors for the desired effect in the final product. Where these materials are not added to the solution prior to drying, they can be added by dry mixing with the cold water soluble gelatin product after drying by simple dry blending or by blending and agglomeration. Typically where the sugar employed in the dessert is sucrose, the ratio of sucrose to gelatin will be within the range of from about 9–15:1. And, where the acid is fumaric acid, the ratio of acid to gelatin will be within the range of from about 0.10–0.30:1. The buffer is preferably employed in an amount effective to adjust the pH of the final product to within the range of from about 3 to about 4.5. The flavorants and colorants are used in widely varying amounts, depending upon the desired end effect. The cold water soluble gelatin dessert can also contain vitamin and mineral supplements if desired.

The following examples are intended to further illustrate and explain the present invention but are not be taken as limiting in any regard:

EXAMPLE 1

This example describes the preparation of cold water soluble gelatin products according to the invention. A solution is prepared by admixing the following materials.

| Ingredients | Parts |
| --- | --- |
| *Corn syrup solids 26 DE | 1523.22 |
| **Beef gelatin 240 + bloom | 290.07 |
| Fumaric acid | 49.50 |
| Tween 60 | 7.50 |

*77.5% solids
**91% solids

The above ingredients are dry blended and the resulting mixture is divided into three equal portions. Each portion is treated separately as follows.

A. This portion (representing the control experiment) is admixed with 209.90 parts of water. The mixture is heated in a steam jacketed kettle to a temperature of about 160° F. while agitating using a Lightnin Mixer and is held at 160° F. for about 5 minutes until all the solids are fully dissolved. Thereafter the solution (solids content 60%) is cooled to about 115° F. and maintained at this temperature while it is fed slowly into a double drum steam heated vacuum dryer in which a thin film of the solution is applied to the rolls which have been adjusted to provide a gap of about 0.01 inches therebetween. The drum dryer is operated using a steam pressure on the rolls of 10–15 psig and an overall vacuum of about 26 ins. of mercury in the drying chamber. The dried product is scraped continuously from the rolls using a doctor blade and the dried, flaky, cold water soluble gelatin is collected. The dried material is then ground gently in a slow speed rotating disc grinder and sifted through a 30 US mesh screen to provide a cold water soluble gelatin powder.

B. This portion is converted to a cold water soluble gelatin powder using the same procedure and amount of water as described in A above with the sole exception that the solution, after heating to 160° F. and cooling to 110° F., is held at 110° F. for 18 hours before being subjected to the drying operation.

C. This portion is converted to a cold water soluble gelatin powder using the same procedure and amount of water as described in A above with the sole exception that the solution, after heating to 160° F. and cooling to 110° F., is held at 110° F. for 24 hours before being subjected to the drying operation.

EXAMPLE 2

This example illustrates the preparation of cold water soluble dry gelatin dessert mixes from the cold water soluble gelatins prepared as described in Example 1. The ingredients and proportions used in all cases are as follows:

| Ingredient | Parts |
| --- | --- |
| Cold water soluble gelatin | 39.43 |
| Cold water soluble fumaric acid | 0.38 |
| Sugar | 43.64 |
| Sodium citrate | 1.30 |
| Ascorbic acid | 0.05 |
| Spray dried flavor | 0.16 |
| F D and C color | 0.04 |
| Antifoam agent | 0.20 |

The above ingredients are dry blended into a homogeneous blend to provide the cold water soluble dry gelatin dessert mix. A gelatin dessert is prepared by adding 16 fluid ounces of cold water at about 55° F. to the dessert mix prepared as described above and stirring the resulting mixture for 3 minutes with a spoon. The resulting solution is then placed in dessert cups and put into a conventional refrigerator at about 45° F. The solution is then held for a period of about one hour. The finished gelatin desserts so prepared exhibit smooth, spoonable gels and are of a consistency suitable for consumption.

The following tests were carried out in respect of each of the desserts so prepared.

Dispersion time: The time (in seconds) required for the sample to disperse in water at 55° F. under standardised conditions.

Amount of surface skin: Depth of skin (in millimeters) on the surface of the solution after dispersion of the mix in water under standardised conditions.

Foam rating: Visual rating on a scale of 1=excellent (no foam) to 5=poor (much foam) of mix dispersion in water.

Penetrometer test: Distance (millimeters) of penetration by 25 g. inverted cone under gravity into the surface of the following gels prepared from a test mix:
(a) gel formed in bloom cup after standing in 10° bath for 1 hr.
(b) same as (a) after 1.5 hr. at 10°.
(c) gel ("dish") formed in cup surmounted by an inverted dish taped in place: gel surface above the rim of the cup is sliced off to expose the inner layer of gel for the test.
(d) gel ("cup") prepared in dessert cup without removal of top surface.

The following results were obtained.

| Cold water gelatin | Dispersion time: secs | Surface skin mm. | Foam Rating | Penetrometer Reading (mm) | | | |
| --- | --- | --- | --- | --- | --- | --- | --- |
| | | | | 10° 1 hr | Bath 1.5 hr | Dish 1 hr | Cup 1 hr |
| Ex. 1A | 7 | 0 | 1 | 224 | 205 | 258 | 220 |
| Ex. 1B | 12 | <0.5 | 1.5 | 222 | 212 | 264 | 197 |
| Ex. 1C | 8 | 0 | 1.5 | 235 | 222 | 277 | 236 |

EXAMPLE 3

Using exactly the procedure and proportions (but one-third the volume) described in Example 1 a dry blend of solids is prepared. One half of the batch (Run 3A) is treated exactly as described in Example 1, Part A, to prepare a cold water soluble gelatin. The other half of the batch (Run 3B) is treated in exactly the same manner with the sole exception that the solution, after heating to 160° F. and cooling to 115° F., is held at about 119° F. for 18 hours before being subjected to the drying operation.

Using the procedure and ingredients set forth in Example 2, dry gelatin dessert mixes are prepared from each of the cold water soluble gelatins so obtained. The finished desserts exhibit smooth, spoonable gels and are of a consistency suitable for consumption. The dessert mixes are subjected to the tests described in Example 2, with the following results:

| Cold water gelatin | Dispersion time: secs | Surface skin mm. | Foam Rating | Penetrometer Reading (mm) | | | |
| --- | --- | --- | --- | --- | --- | --- | --- |
| | | | | 10° 1 hr | Bath 1.5 hr | Dish 1 hr | Cup 1 hr |
| Ex. 3A | 5 | 1 | 1.5 | 232 | 218 | 272 | 242 |
| Ex. 3B | 7 | 0 | 1.5 | 254 | 242 | 292 | 256 |

In addition to exhibiting less scum the dessert prepared from Run 3B exhibited greater clarity.

EXAMPLE 4

The preparation of cold water soluble gelatine described in Example 3 is repeated except that, in the run (Run 4B) which is subjected to a hold period at 119° F. the time of hold was 19 hours. No holding period was employed in the control run (Run 4A). Using the procedure and ingredients set forth in Example 2, dry gelatin dessert mixes are prepared from each of the cold water soluble gelatins so obtained. The finished desserts exhibit smooth, spoonable gels and are of a consistency suitable for consumption. The dessert mixes are subjected to the tests described in Example 2, with the following results.

| Cold water gelatin | Dispersion time: secs | Surface skin mm. | Foam Rating | Penetrometer Reading (mm) | | | |
| --- | --- | --- | --- | --- | --- | --- | --- |
| | | | | 10° 1 hr | Bath 1.5 hr | Dish 1 hr | Cup 1 hr |
| Ex. 4A | 12 | 0.5 | 1 | 226 | 209 | 248 | 212 |
| Ex. 4B | 9 | 0 | 1 | 264 | 251 | 285 | 268 |

EXAMPLE 5

This example describes the preparation of further cold water soluble gelatin products according to the invention. Solutions are prepared by admixing the following materials.

| Ingredients | Parts by wt. |
| --- | --- |
| Corn syrup solids (26 DE: 77.5% solids) | 1012.26 |
| Beef gelatin 240 + bloom (90.5% solids) | 193.38 |
| Fumaric Acid | 33.00 |
| Tween 60 (Polysorbate 60) | 7.50 |

The above ingredients are dry blended and the resulting mixture is divided into two equal portions. One portion (Run 5A) is treated exactly as described in Example 1, part A, to prepare a cold water soluble gelatin. The other portion (Run 5B) is treated in exactly the same manner with the sole exception that the solution, after heating to 160° F. and cooling to 115° F., is held at about 112° F. for a total of 20 hours before being subjected to the drying operation.

EXAMPLE 6

This example describes the preparation of further cold water soluble gelatin products according to the invention. Solutions are prepared by admixing the following materials.

| Ingredients | Parts by wt. |
| --- | --- |
| Maltrin ® 200[1] (93% solids) | 846.24 |
| Beef gelatin 240 + bloom (90.5% solids) | 193.38 |
| Fumaric Acid | 33.30 |
| Tween 60 | 5.0 |

[1] Maltodextrin of DE20: Grain Processing Corp.

The above ingredients are dry blended and the resulting mixture is divided into two equal portions. One portion (Run 6A) is treated exactly as described in Example 1, part A, to prepare a cold water soluble gelatin. The other portion (Run 6B) is treated in exactly the same manner with the sole exception that the solution, after heating to 160° F. and cooling to 115° F., is held at about 118° F. for a total of 19 hours before being subjected to the drying operation.

EXAMPLE 7

This example describes the preparation of further cold water soluble gelatin products according to the invention. Solutions are prepared by mixing the following ingredients.

| Ingredients | Parts by wt. |
| --- | --- |
| Corn syrup solids (26.DE: 77.5% solids) | 1029.00 |
| Beef gelatin 240 + bloom (90.5% solids) | 193.38 |
| Fumaric acid | 20.00 |
| Tween 60 | 7.50 |

The above ingredients are dry blended and the resulting mixture is divided into two equal portions. One portion (Run 7A) is treated exactly as described in Example 1, part A (using 208.39 parts of water) with the sole exception that the solution, after heating to 160° F. and cooling to 115° F., is held at about 112° F. for 4 hours before being subjected to the drying operation. The other portion (Run 7B) is treated in exactly the same manner except that the hold time is 22 hrs. at a temperature of about 118° F.

EXAMPLE 8

This example describes the preparation of a further cold water soluble gelatin product according to an alternative embodiment of the invention. Solutions are prepared by mixing the following ingredients.

| Ingredients | Parts by wt. |
| --- | --- |
| Corn syrup (26 DE: 77.5% solids) | 1582.26 |
| Beef gelatin 240 + bloom (90.5% solids) | 290.07 |
| Tween 60 | 11.25 |

The above ingredients are dry blended and the resulting mixture is divided into three equal portions. One portion (Run 8A) is admixed with 205.47 parts of water and the mixture is heated to about 160° F. using the process and equipment described in Example 1, part A. When all the solids are fully dissolved the solution is cooled to about 115° F. and 16.5 parts of fumaric acid is added. The resulting solution is then dried using the procedure and equipment described in Example 1, part A to provide the cold water soluble gelatin as a dry powder.

A second portion (Run 8B) of the dry blend is then treated in exactly the same manner with the sole exception that the solution, after cooling and prior to the addition of the fumaric acid, is held at about 128° F. for a period of 21 hours.

A third portion (Run 8C) of the dry blend is then treated in exactly the same manner as Run 8B except that the hold period is 25 hours rather than 21 hours.

EXAMPLE 9

This example describes the preparation of a further cold water soluble gelatin product (Run 9) according to an alternative embodiment of the invention. A solution was prepared from the following ingredients.

| Ingredients | Parts by wt. |
| --- | --- |
| Corn syrup (26 DE: 77.5% solids) | 506.13 |
| Beef gelatin 240 + bloom (90.5% solids) | 96.69 |
| Tween 60 | 3.75 |

The above ingredients are dry blended and mixed with 210.26 parts of water. The mixture is heated to about 160° F. using the process and equipment described in Example 1, part A. When all the solids are fully dissolved the solution is cooled to about 120° F. and maintained for a total of 3 hours. At the end of this period 16.5 parts of fumaric acid are added and immediately thereafter the resulting solution is dried using the procedure and equipment described in Example 1, part A to provide a cold water soluble gelatin as a dry powder.

EXAMPLE 10

This example describes the preparation of a further cold water soluble gelatin product (Run 10) according to an alternative embodiment of the invention. A solution was prepared from the following ingredients.

| Ingredients | Parts by wt. |
| --- | --- |
| Corn syrup (26 DE: 77.5% solids) | 501.29 |
| Beef gelatin 240 + bloom (90.5% solids) | 102.21 |
| Tween 60 | 2.5 |

The above ingredients are dry blended and mixed with 210.83 parts of water. The mixture is heated to about 160° F. using the process and equipment described in Example 1, part A. When all the solids are fully dissolved 16.5 parts of fumaric acid are added and the resulting solution is cooled to 115° F. and held at that temperature for 1.5 hours. At the end of this period the solution is dried using the procedure and equipment described in Example 1, part A, to provide a cold water soluble gelatin as a dry powder.

EXAMPLE 11

This example illustrates the preparation and properties of dry gelatin dessert mixes and desserts prepared from each of the cold water soluble gelatins of Examples 5 to 10, inclusive. Each of the dessert mixes and desserts is prepared using the procedure and ingredients set forth in Example 2 but replacing the cold water soluble gelatin there used by an equal amount of the appropriate cold water soluble gelatin of Examples 5 to 10. The finished gelatin desserts so prepared, with the exception of that prepared from Run 8C, exhibit smooth, clear spoonable gels and are of a consistency suitable for consumption. The dessert prepared from cold water soluble gelatin Run 8C exhibited slight pebbling but was acceptable in all other respects.

The four tests described in Example 2 are carried out on each of the above dessert mixes and desserts with the following results.

| Cold water gelatin | Dispersion time: secs | Surface skin mm. | Foam Rating | Penetrometer Reading (mm) | | | |
|---|---|---|---|---|---|---|---|
| | | | | 10° 1 hr | Bath 1.5 hr | Dish 1 hr | Cup 1 hr |
| Ex. 5A | 14 | 0 | 1.0 | 219 | 205 | 242 | 213 |
| Ex. 5B | 5 | 0 | 1.0 | 256 | 234 | 294 | 252 |
| Ex. 6A | 12 | 0 | 1.5 | 230 | 219 | 254 | 227 |
| Ex. 6B | 6 | 0 | 1.5 | 266 | 250 | 298 | 315 |
| Ex. 7A | 12 | 0 | 1.0 | 220 | 214 | 259 | 228 |
| Ex. 7B | 7 | 0 | 1.0 | 249 | 244 | 289 | 276 |
| Ex. 8A | 9 | 0 | 1.0 | 241 | 220 | 273 | 248 |
| Ex. 8B | 8 | 0 | 1.0 | 251 | 235 | 288 | 256 |
| Ex. 8C | 6 | 0 | 1.0 | 269 | 254 | 302 | 273 |
| Ex. 9 | 6 | 0 | 2.0 | 243 | 224 | 277 | 238 |
| Ex. 10 | 4 | 0 | 1.0 | 236 | 226 | 273 | 237 |

What is claimed is:

1. A process for preparing a cold water soluble gelatin product comprising:
   preparing an aqueous solution by heating, at a temperature of about 150° F. to about 180° F., a mixture comprising water, gelatin, a sugar selected from the group consisting of corn syrup solids, maltodextrin and mixtures thereof, and an amount of surface-active agent effective to increase dispersibility in the final product;
   maintaining the solution so obtained at at least one temperature in the range of about 110° F. to about 180° F. for a period of about 1 hour at the higher end of the temperature range to about 24 hours at the lower end of the temperature range; and
   thereafter drying the resulting solution in the presence of an acid.

2. A process according to claim 1 wherein said acid is introduced at the stage of initial formation of the aqueous solution.

3. A process according to claim 1 wherein said acid is introduced after the initial formation of the aqueous solution but prior to commencement of the holding period.

4. A process according to claim 1 wherein said acid is introduced after the holding period and immediately prior to the drying step.

5. A process according to claim 1 wherein said holding period is carried out at about 160° F. and the solution is thereafter cooled to about 115° F. prior to the drying step.

6. A process according to claim 1 wherein said holding period is carried out at a temperature in the range of about 115° F. to about 130° F.

7. A process according to claim 5 wherein said acid is added to the solution prior to the start of the holding period.

8. A process according to claim 5 wherein said acid is added to the solution after the solution has been cooled to about 115° F. and prior to the drying step.

9. A process according to claim 1 wherein the acid is selected from the group consisting of fumaric, adipic and citric acids.

10. A process according to claim 1 wherein the weight ratio of acid to gelatin is within the range of about 0.05:1 to about 0.5:1.

11. A process according to claim 9 wherein the weight ratio of acid to gelatin is within the range of about 0.1:1 to about 0.23:1.

12. A process according to claim 1 wherein the weight ratio of sugar to gelatin is within the range of greater than 2:1 to about 12:1.

13. A process according to claim 12 wherein the weight ratio of sugar to gelatin is within the range of about 3:1 to about 7:1.

14. A process according to claim 1 which includes the additional step of comminuting and screening the dried material to a particle size from about 20 to about 200 US series mesh.

15. A process according to claim 14 wherein the dried material is of a particle size such that 90 percent of the particles will pass through 30 US series mesh and will be retained on 200 US series mesh.

16. A cold water soluble gelatin product produced in accordance with the process of claim 1.

17. A gelatin desert mix comprising a cold water soluble gelatin product prepared in accordance with the process of claim 1, a buffer, flavoring material and coloring material.

18. A gelatin dessert mix according to claim 17 wherein the buffer is employed in an amount effective to adjust the pH of an aqueous solution of the gelatin dessert mix to a value within the range of about 3 to about 4.5.

19. A gelatin dessert mix according to claim 17 wherein additional sugar is admixed therein to bring the total sugar to gelatin ratio by weight to within the range of about 8:1 to 15:1.

20. A gelatin dessert mix according to claim 17 which is capable of completely dissolving in tap water in less than about 5 minutes with vigorous stirring.

* * * * *